United States Patent
Bandyopadhyay et al.

(10) Patent No.: US 11,055,881 B2
(45) Date of Patent: Jul. 6, 2021

(54) SYSTEM AND A METHOD FOR PROVIDING COLOR VISION DEFICIENCY ASSISTANCE

(71) Applicant: Cognizant Technology Solutions India Pvt. Ltd., Chennai (IN)

(72) Inventors: Avinandan Bandyopadhyay, Kolkata (IN); Subhas Chakraborty, Kolkata (IN); Ramesh Yechangunja, Bangalore (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 77 days.

(21) Appl. No.: 16/515,607

(22) Filed: Jul. 18, 2019

(65) Prior Publication Data

US 2020/0349744 A1 Nov. 5, 2020

(30) Foreign Application Priority Data

May 1, 2019 (IN) .............................. 201941017347

(51) Int. Cl.
*G06T 11/00* (2006.01)
*G06T 7/90* (2017.01)
*G06T 9/40* (2006.01)
*H04N 1/60* (2006.01)

(52) U.S. Cl.
CPC .............. *G06T 11/001* (2013.01); *G06T 7/90* (2017.01); *G06T 9/40* (2013.01); *H04N 1/60* (2013.01); *G06T 2207/10024* (2013.01)

(58) Field of Classification Search
CPC . G06T 11/001; G06T 7/90; G06T 9/40; G06T 2207/10024; H04N 1/60
See application file for complete search history.

(56) References Cited

U.S. PATENT DOCUMENTS

| | | | |
|---|---|---|---|
| 7,737,992 B2 | 6/2010 | Hong | |
| 8,792,138 B2 | 7/2014 | Boggs | |
| 10,319,116 B1 * | 6/2019 | C | .............................. G09G 5/10 |
| 2005/0012755 A1 * | 1/2005 | Dresevic | .............. A63B 71/023 345/581 |

(Continued)

OTHER PUBLICATIONS

Jyoti D. Badlani et. al,"A Novel Technique for Modification of Images for Deuteranopic Viewers", IJARCCE, vol. 5, Issue 4, Apr. 2016, pp. 467-473; URL: https://www.ijarcce.com/upload/2016/april-16/IJARCCE%20118.pdf.

(Continued)

*Primary Examiner* — David F Dunphy
(74) *Attorney, Agent, or Firm* — Cantor Colburn LLP (57) ABSTRACT

The present invention discloses a system and a method for providing color vision deficiency assistance by selectively recoloring pixels of an image frame including unperceivable colors with perceivable colors in real time. In particular, the present invention provides for rescaling the image frame using a first set of rules. Further, a perceivable color space is selected based on one or more parameters. Furthermore, one or more pixels associated with unperceivable colors are identified using a second set of rules. Yet further, the identified one or more pixels are recolored using the selected perceivable color space and a third set of rules. Finally, a corrected image frame comprising perceivable colors is provided.

24 Claims, 3 Drawing Sheets

(56) References Cited

U.S. PATENT DOCUMENTS

2007/0273708 A1* 11/2007 Andreasson .......... G06T 11/001
                                                                        345/593
2014/0233070 A1*  8/2014 Kishimoto ............... H04N 1/60
                                                                        358/3.21
2019/0279402 A1*  9/2019 Panetta .................... G06T 7/10

OTHER PUBLICATIONS

Luke Jefferson et. al, "An Interface to Support Color Blind Computer Users", Proceedings of the SIGCHI Conference on Human Factors in Computing Systems, Apr. 28-May 3, 2007, pp. 1535-1538; URL:http://citeseerx.ist.psu.edu/viewdoc/download?doi=10.1.1.107.8159&rep=rep1&type=pdf.

Niladri Halder et. al,"Image Color Transformation for Deuteranopia Patients using Daltonization", IOSR Journal of VLSI and Signal Processing, vol. 5, Issue 5, Ver. I (Sep.-Oct. 2015), pp. 15-20; URL: http://www.iosrjournals.org/iosr-jvlsi/papers/vol5-issue5/Version-1/C05511520.pdf.

\* cited by examiner

SYSTEM AND A METHOD FOR PROVIDING COLOR VISION DEFICIENCY ASSISTANCE

CROSS REFERENCE TO RELATED APPLICATION

This application is related to and claims the benefit of Indian Patent Application Number 201941017347 filed on May 1, 2019, the contents of which are herein incorporated by reference in their entirety.

FIELD OF THE INVENTION

The present invention relates generally to the field of image processing. More particularly, the present invention relates to a system and a method for providing color vision deficiency assistance by converting non-perceivable colors of a visual image into perceivable colors based on one or more types of color vision deficiency.

BACKGROUND OF THE INVENTION

Human color vision is based on cone cells and rod cells, where primarily cone cells are responsible for color vision and function in high levels of illumination. The average human has three types of cone cells, long wave sensitive cones, medium wave sensitive cones and short wave sensitive referred to as trichromacy. The wavelengths of these three cone types are very close to the primary colors red, green and blue and are therefore referred to as red, green and blue cone types. Mixing the input of these three cones types makes up entire visible color spectrum for a human eye.

A color vision deficiency is primarily caused due to abnormalities in the one or more cone types or due to lack of one or more cone types. The types of color vision deficiency may include anomalous trichromacy, dichromacy and monochromacy. People with said color vision deficiencies may encounter difficulties in distinguishing colors in the images or any real time visual content. Some of the existing techniques assist color deficient individuals to decipher colors present in any visual content from each other. Said techniques uniformly shifts colors away from confusion lines towards colors visible to the color deficient individual. However, the existing techniques processes all the pixels of the image while converting the image from RGB color space to LMS color space, leading to a loss in originality of the image color. In particular, since the process is applied to all pixels of the image, the originality of the image colors is compromised even for regions of the image which are easily perceivable by the color deficient individual. Further, the existing techniques lead to higher computation cost while processing a high-resolution live-streaming of frames which have smaller color-conflict regions.

In light of the above drawbacks, there is a need for a system and a method for providing color vision deficiency assistance by selectively converting image pixels comprising non-perceivable colors. There is a need for a system and a method which provides flexibility to personalize the visible color range based on severity of color vision deficiency (CVD). Further, there is a need for a system and a method which can be easily deployed in any of the existing devices.

SUMMARY OF THE INVENTION

In various embodiments of the present invention, a method for providing color vision deficiency assistance by selectively recoloring pixels of an image frame including unperceivable colors is provided. The method is implemented by at least one processor executing program instructions stored in a memory. The method comprises rescaling the image frame using a first set of rules, wherein the first set of rules comprises converting the retrieved image of resolution M by N into a resolution P by Q. The method further comprises selecting a predefined perceivable color space based on one or more parameters. Further, the method comprises identifying one or more pixels of the rescaled image frame associated with respective unperceivable colors for recoloring using a second set of rules. Furthermore, the method comprises recoloring the identified one or more pixels using the selected perceivable color space and a third set of rules.

In various embodiments of the present invention, a system for providing color vision deficiency assistance in real time is provided. The system comprises a memory storing program instructions, a processor configured to execute program instructions stored in the memory, and a color correction engine in communication with the processor. The system is configured to rescale a retrieved image frame using a first set of rules, wherein the first set of rules comprises converting the retrieved image of resolution M by N into a resolution P by Q. Further, the system is configured to select a predefined perceivable color space based on one or more parameters. Furthermore, the system is configured to identify one or more pixels of the rescaled image frame associated with one or more unperceivable colors for recoloring using a second set of rules. Yet further, the system is configured to recolor the identified one or more pixels using the selected perceivable color space and a third set of rules.

In various embodiments of the present invention, a computer program product is provided. The computer program product comprises a non-transitory computer-readable medium having computer-readable program code stored thereon, the computer-readable program code comprising instructions that, when executed by a processor, cause the processor to rescale a retrieved image frame using a first set of rules. The first set of rules comprises converting the retrieved image of resolution M by N into a resolution P by Q. Further, a predefined perceivable color space based on one or more parameters is selected. Furthermore, one or more pixels of the rescaled image frame associated with one or more unperceivable colors are identified for recoloring using a second set of rules. Yet further, the identified one or more pixels are recolored using the selected perceivable color space and a third set of rules.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

The present invention discloses a system and a method for providing color vision deficiency assistance. In particular, the system and method of the present invention selectively recolors pixels of an image comprising unperceivable colors with perceivable colors in real time based on the type of color vision deficiency. The present invention provides rescaling of a retrieved image using a first set of rules. The first set of rules comprises converting the retrieved image of resolution M by N into a resolution P by Q. Further, one or more unperceivable colors are detected and a perceivable color space is selected based on one or more parameters. Furthermore, the present invention, provides for identification of one or more pixels associated with unperceivable color using a second set of rules. The recoloring is done based on the selected perceivable color space using a third set of rules. Finally, a corrected image comprising perceivable colors is provided. Further, the present invention provides for generating a machine learning model based on the output image for correcting future input images.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
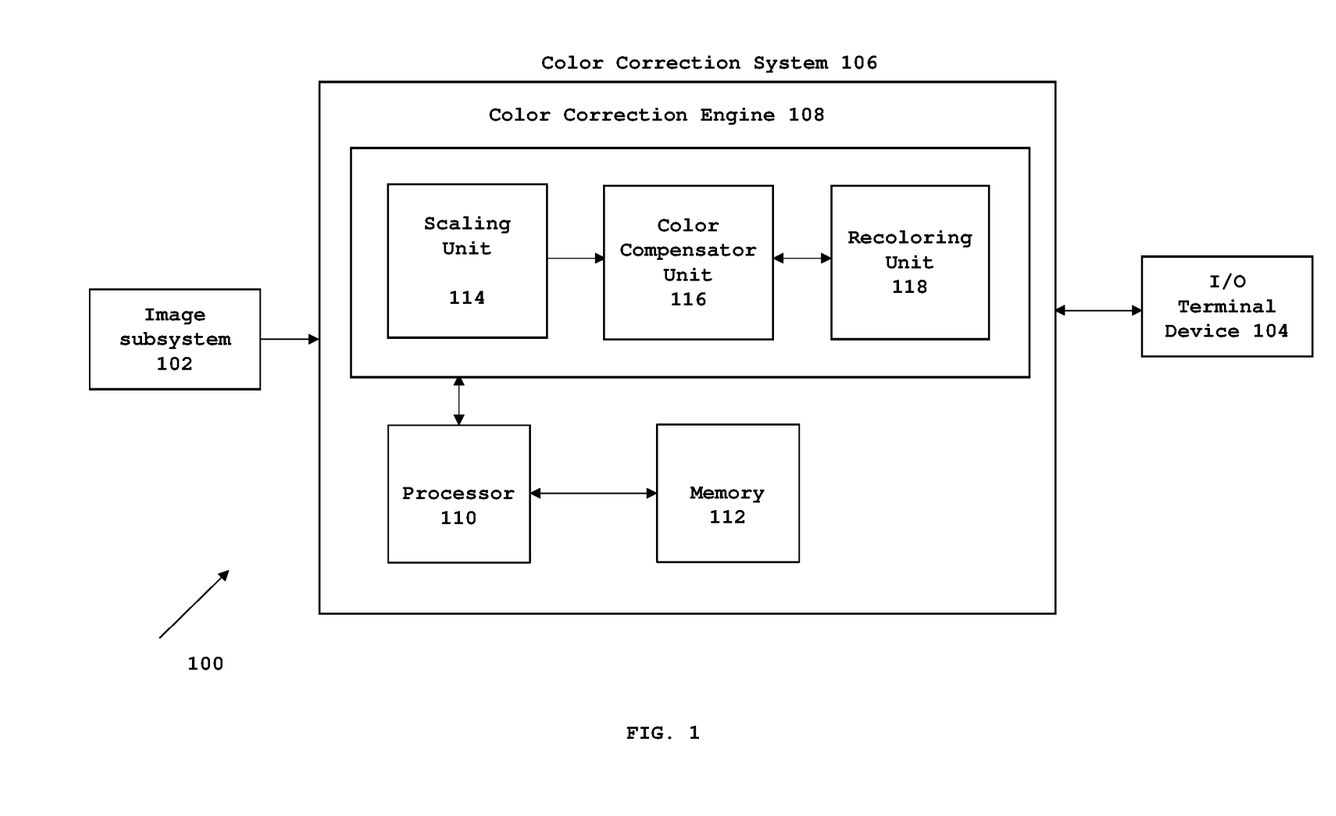
FIG. 1 illustrates a detailed block diagram of a system for providing color vision deficiency assistance, in accordance with an embodiment of the present invention.

FIG. 1 illustrates a detailed block diagram of a system for providing color vision deficiency assistance, in accordance with an embodiment of the present invention. Referring to FIG. 1, in an embodiment of the present invention, an environment 100 for a system for providing color vision deficiency assistance is illustrated. In various embodiments of the present invention, the environment 100 comprises an image subsystem 102, an input/output (I/O) terminal device 104 and a system for providing color vision deficiency assistance hereinafter referred to as color correction system 106.

In an embodiment of the present invention, the image subsystem 102 is an on-screen graphics generation unit of computing devices such as, but not limited to, smartphones, laptops, desktops, cameras, lenses, Virtual reality (VR) devices, Augmented reality (AR) devices and Mixed reality (MR) devices and the like. In an exemplary embodiment of the present invention, the image subsystem 102 may be an on screen graphic engine of an operating system running on a computing device. In another embodiment of the present, the image subsystem 102 may be a rendering engine of web browsers. In another embodiment of the present invention, the image subsystem 102 may be any device capable of capturing and displaying any visual content in real time. Examples of visual content may include, but are not limited to images, videos and graphics.

In various exemplary embodiments of the present invention, the input/output (I/O) terminal device 104 may include, but is not limited to, a touchscreen display, microcomputer or any other wired or wireless device capable of receiving inputs and displaying output results. In an exemplary embodiment of the present invention, the I/O terminal device 104 is configured to receive one or more inputs from a color deficient individual and output corrected images received from the color correction system 106. In an exemplary embodiment of the present invention, the I/O terminal device 104 is configured with a user interface (not shown) to facilitate user interaction with the color correction system 106.

The color correction system 106 may be a hardware, software or a combination of hardware and software. In an exemplary embodiment of the present invention, the color correction system 106 may be integrated with the image subsystem 102. In an exemplary embodiment of the present invention, the image subsystem 102, the I/O terminal device 104 and the color correction system 106 may be boxed as a single unit. In an embodiment of the present invention, as shown in FIG. 1, the color correction system 106 interfaces with the image subsystem 102 and the I/O terminal device 104. The color correction system 102 interfaces with the image subsystem 102 to retrieve images or frames of a video. Further, the color correction system 106 interfaces with the I/O terminal device 104 to receive inputs and/or output corrected images or frames. In an exemplary embodiment of the present invention, the color correction system 106 may interface with the image subsystem 102 and the I/O terminal device 104 over a communication channel (not shown). Examples of the communication channel may include, but are not limited to, a physical transmission medium, such as, a wire, or a logical connection over a multiplexed medium, such as, a radio channel in telecommunications and computer networking. Examples of radio channel in telecommunications and computer networking may include a Local Area Network (LAN), a Metropolitan Area Network (MAN), and a Wide Area Network (WAN).

In another embodiment of the present invention, the color correction system 106 may be implemented as a client-server architecture, wherein a client terminal device (not-shown) accesses a server hosting the color correction system 106 over a communication channel (not shown).

In another embodiment of the present invention, the color correction system 106 may be implemented in a cloud computing architecture in which data, applications, services, and other resources are stored and delivered through shared data-centers. In an exemplary embodiment of the present invention, the functionalities of the color correction system 106 are delivered as software as a service (SAAS).

The color correction system 106 comprises a color correction engine 108, a processor 110 and a memory 112. The color correction engine 108 is operated via the processor 110 specifically programmed to execute instructions stored in the memory 112 for executing functionalities of the system 106 in accordance with various embodiments of the present invention. In various embodiments of the present invention, the color correction engine 108 is configured to analyze and rescale images, detect unperceivable colors, identify unperceivable color pixels for correction and selectively recolor identified pixels to provide a corrected image. In particular, the color correction engine 108 selectively recolors pixels of image streams comprising unperceivable colors with perceivable colors in real time based on the type of color vision deficiency.

In various embodiments of the present invention, color correction engine 108 has multiple units which work in conjunction with each other for providing color vision deficiency assistance. The various units of the color correction engine 108 are operated via the processor 110 specifically programmed to execute instructions stored in the memory 112 for executing respective functionalities of the multiple units in accordance with various embodiments of the present invention.

In an embodiment of the present invention, the color correction engine 108 comprises a scaling unit 114, a color compensator unit 116 and a recoloring unit 118. In an embodiment of the present invention, the scaling unit 114 is configured to rescale an image frame retrieved from the image subsystem 102 using a first set of rules. In an exemplary embodiment of the present invention, the first set of rules include converting the retrieved image frame of resolution M by N into a desired resolution P by Q using the equations below:

$$P/X=2^i, \text{ where}(2^i \times X) \leq M < (2^{(i+1)} \times X), X >= 3, P/X >= 1$$
and $$Q/Y=2^j, \text{ where}(2^j \times Y) \leq N < (2^{(j+1)} \times Y), Y >= 3, Q/Y >= 1,$$

wherein M, N, P, Q, X, Y, i and j are integers.

In an embodiment of the present invention, the value of X and Y are representative of a size selected for the leaf node (smallest matrix) which is discussed in detail later in the specification. In an exemplary embodiment of the present invention, $X=Y=3$ as the selected size of the leaf node is 3×3 as discussed later in the specification.

In an exemplary embodiment of the present invention, the scaling unit 114 is configured to prevent the rescaling of the retrieved image beyond a predefined threshold resolution. In the exemplary embodiment of the present invention, the predefined threshold resolution is 75% of the original scale of the image frame. In an exemplary embodiment of the present invention, $P/M >= 0.75$ and $Q/N >= 0.75$.

The color compensator unit 116 is configured to receive the rescaled image from the scaling unit 114. The color compensator unit 116 is configured to select a predefined perceivable color space based on one or more parameters. In an embodiment of the present invention, the one or more parameters include the type of color vision deficiency, closeness of color space with human perception of colors and one or more inputs received from a color deficient individual. In operation, the color compensator unit 116 converts an initial color space of the rescaled image frame into another color space (hereinafter referred to as conversation color space) based on the closeness of color space with human perception of colors. In an embodiment of the present invention, the initial color space is the RGB (Red, Green, Blue) color space. Examples of color space may include, but are not limited to, HSL (Hue, Saturation, Lightness), HSV (Hue, Saturation, Value), or LMS (Long-range, middle-range, short-range wavelength) color space or any other color space which aligns more closely with human perception of colors. In an exemplary embodiment of the present invention, the conversion color space is HSL (Hue, Saturation, and Lightness). The color compensator unit 116 converts the RGB color space of the rescaled image into HSL color space by deriving the HSL (Hue, Saturation, and Lightness) values for each pixel of the rescaled image frame from the corresponding RGB (Red, Green, and Blue) values.

Further, the color compensator unit 116 categorizes the conversion color space into a perceivable color space and an unperceivable color space based on one or more unperceivable colors in the rescaled image. The color compensator unit 116 detects the one or more unperceivable colors based on the type of color vision deficiency and one or more inputs received from a color deficient individual. The color compensator unit 116 selects the perceivable color space for recoloring. In an exemplary embodiment of the present invention, if the color vision deficiency is deuteranopia, red-green colors are selected as unperceivable colors and shades of red-green are detected in the rescaled image. Further, the extent to which the red-green colors are unperceivable is detected based on one or more inputs from the color deficient individual. In an exemplary embodiment of the present invention, the one or more inputs from the color deficient individual include fine tuning an extent to which the unperceivable colors are not visible based on a degree of severity of color vision deficiency. In an exemplary embodiment of the present invention, where the conversion color space is HSL and the color vision deficiency is deuteranopia, the perceivable color space excludes red-green colors along with one or more shades of red-green color.

In an embodiment of the present invention, the color compensator unit 116 is configured to maintain a color compensator table (not shown). The color compensator table is a dynamic table configured to maintain a record of each perceivable color mapped with one or more unperceivable colors. In a preferred embodiment of the present invention, each perceivable color is mapped with a single unperceivable color. The color compensator table is initially empty and is populated on the fly by the color compensator unit 116 with color mapping information received from the recoloring unit 118 as described later in the specification to update the color compensator table.

In an embodiment of the present invention, the recoloring unit 118 is configured to receive the rescaled image, the conversion color space value of each of the pixels of the rescaled image, and the selected perceivable color space from the color compensator unit 116. In various embodiments of the present invention, the recoloring unit 118 is configured to identify one or more pixels of the rescaled image frame associated with respective unperceivable colors using a second set of rules. In an embodiment of the present invention, the second set of rules comprises using a quasi-region based quad-tree technique by the recoloring unit 118 to identify one or more pixels associated with unperceivable colors. In an embodiment of the present invention, a quasi-region based quad-tree represents a partition of space in two dimensions by decomposing the region into possibly four equal quadrants, sub-quadrants, and so on. The 2-dimensional space is representative of a root node, and each quadrant is representative of child node of the root node. Each sub-quadrant is representative of a child node of a quadrant whereby each quadrant is interpreted as a parent node. Similarly, each sub-quadrant is interpreted as a parent node for its children. Each node in the tree can have four or two or zero children. The node with zero children is representative of a leaf node. If a child of a node is a leaf node, all other children of that parent node must also be leaf nodes. Each leaf node in the quasi-region based quad-tree comprises data corresponding to a specific sub-region.

In operation, the recoloring unit 118 constructs a quasi-region based quad-tree data structure on the rescaled image frame. The rescaled image frame is interpreted as a 2-Dimensional matrix comprising a plurality of pixels. Further, the rescaled image frame is representative of a root node. In an exemplary embodiment of the present invention, for resolution P by Q of the rescaled image frame, the rescaled image frame is interpreted as P×Q matrix comprising P rows and Q columns. Each pixel position in the rescaled image frame is represented as Position (P, Q), and pixel color value is represented as Color (P, Q). The rescaled image frame (root node) is further split into four quadrants (child nodes of root). Each of the four quadrants (parent nodes) are recursively split into four, two or zero sub-quadrants (child nodes of parent) upto a plurality of leaf nodes, until the entire rescaled image is split into multiple of leaf nodes. In an embodiment of the present invention the size of the leaf node is selected based on the size of pixel matrix. In an exemplary embodiment of the present invention, each leaf node is representative of a 3×3 matrix and is logically divided into 8 border pixels and 1 center pixel. As described above, each leaf node is representative of a node with no child. In an exemplary embodiment of the present invention, a 3×3 matrix is selected as a leaf node, however in other embodiments of the present invention, 3×4 or 4×3 matrix having 2 central pixels surrounded by 10 border pixels may be selected as a leaf node. Each leaf node comprises color information associated with corresponding pixels. In an exemplary embodiment of the present invention, where the rescaled image is converted into corresponding HSL color space, each pixel of respective leaf node has an HSL value corresponding to its RGB value.

Further, the second set of rule comprises identifying each leaf node comprising one or more center pixels and a plurality of border pixels having one or more unperceivable colors. In an embodiment of the present invention, the identification is performed by analyzing the color space values of each leaf node and rejecting the leaf nodes with border pixels and center pixels in the perceivable color space. In an exemplary embodiment of the present where the color conversion color space is HSL, a check is performed to determine if the HSL value of each of the plurality of border pixels and the center pixel of the leaf node is in the perceivable color space. The leaf nodes, where the border pixels and center pixels have the HSL value in the perceivable color space.

The second set of rules further include determining by the recoloring unit 118 one or more contender nodes comprising one or more center pixels having unperceivable colors different from each of the corresponding plurality of border pixels. In particular, the recoloring unit 118 recursively analyzes color space values of the one or more center pixels and the plurality of border pixels of each of the identified leaf node until one or more center pixels are found to be having unperceivable colors different from each of the corresponding plurality of border pixels. Further, the recoloring unit 118 selects the one or more center pixels of each of the contender nodes for recoloring. The recoloring unit 118 repeats the step of determining contender nodes on the higher nodes of the identified leaf node upto to the root node if the one or more unperceivable colors of the center pixels of the leaf nodes are not found to be different from the corresponding border pixels. The recoloring unit 118 repeats the step of determining contender nodes until border and center pixels of different unperceivable colors are determined in the higher nodes upto the root node and the center pixels of the contender node are selected for recoloring. In an exemplary embodiment of the present invention, the recoloring unit 118 performs a check to determine if both the border and the center pixels of the leaf node are of same unperceivable color by analyzing if the HSL value of the border pixels and the center pixel is same. The recoloring unit 118 selects the parent node of the leaf node for further analyses if both the border and the center pixels of the leaf node are of the same unperceivable color. Furthermore, the recoloring unit 118 performs a check to determine if both the border and the center pixels of the selected parent node are of the same unperceivable color.

Further, the recoloring unit 118 is configured to recolor each of the identified one or more pixels associated with respective unperceivable colors using a third set of rules. In an embodiment of the present invention, each center pixel associated with unperceivable color for each contender node including leaf node or associated higher nodes of the leaf node is recolored if both the border pixels and center pixel(s) are of different unperceivable colors. In an exemplary embodiment of the present invention, the higher nodes include parent nodes upto the root node of the leaf node. In case the contender for recoloring is the parent node, the border pixels are recomputed which are different from the border pixels of its children. In an embodiment of the present invention, each center pixel is recolored recursively starting from the leaf node through the associated higher nodes upto the root node. Further, the recoloring unit 118 determines a suitable perceivable color for recoloring the center pixels by considering all the colors associated with the border pixels.

The recoloring unit 118, recolors identified one or more pixels associated with unperceivable colors based on the selected perceivable color space using a third set of rules. In an embodiment of the present invention, the third set of rules comprises determining by the recoloring unit 118 if a color compensator table is empty and choosing a new color from the selected perceivable color space if no mapping exists in the color compensator table. The recoloring unit 118 chooses a new color from the selected perceivable color space using a fourth set of rules as described later in the specification.

The third set of rules further includes identifying by the recoloring unit 118 a color mapping between an unperceivable color associated with one of the identified one or more pixels and a perceivable color in a color compensator table if an availability of color mapping in the color compensator table is determined. Repeating the step of identification for each of the identified one or more pixels. In particular, for each Position (P, Q) of a pixel, if Color (P, Q) is unperceivable, a check is performed to determine if Color (P, Q) is already mapped with a perceivable color in the color compensator table.

Further, the third set of rules include, recoloring one of the identified one or more pixels with the identified color mapping if color of each of the corresponding border pixels is found to be different from the perceivable color mapped in the color compensator table. The step of recoloring is repeated for the other identified pixels. In particular, for each Position (P, Q), a check is performed to validate that the Color (P, Q) is not equal to any of the boundary colors [Color (P−1, Q−1), Color (P−1, Q), Color (P−1, P+1), Color (P, Q−1), Color (P, Q+1), Color (P+1, Q−1), Color (P+1, Q) and Color (P+1, Q+1)]

Finally, the third set of rules include choosing by the recoloring unit 118 a new color from the selected perceivable color space using a fourth set of rules for recoloring the identified one or more pixels associated with the unperceivable color if color of any of the corresponding border pixels is same as the perceivable color mapped in the color compensator table.

The fourth set of rules comprises selecting by the recoloring unit 118 the new color for one of the identified pixels associated with the unperceivable color by computing minimum distance between color space value associated with the unperceivable color and color space values of each of the corresponding border pixel colors. In an exemplary embodiment of the present invention, the least difference (Minimum-Distance) of the color space value associated with Color (P, Q) from neighboring colors, Color (P−1, Q−1), Color (P−1, Q), Color (P−1, Q+1), Color (P, Q−1), Color (P, Q+1), Color (P+1, Q−1), Color (P+1, Q) and Color (P+1, Q+1) is computed. A Position (P', Q') for the pixel having least difference with Color (P, Q) is determined based on the computation a Position (P', Q') of the corresponding border pixels with minimum distance.

The fourth set of rules further comprises determining by the recoloring unit 118 if the pixel at Position (P', Q') in the rescaled image frame is re-colored into different color space value. The new color having a distance nearest to the computed minimum distance is chosen from the selected perceivable color space if the border pixel at Position (P', Q') is found to be recolored. In particular, a new color is chosen from the selected perceivable color space having distance nearest to Minimum-Distance, (Color (P, Q)–Color (P', Q') Minimum-Distance, if the pixel at Position (P', Q') in the rescaled image frame is already re-colored into a different color value. The step of selecting the new color is repeated for the other identified pixels.

The recoloring unit 118 chooses the new color from the selected perceivable color space for recoloring one of the identified pixels if the pixel at Position (P', Q') is not recolored. In particular, the recoloring unit 118 chooses a new color (NC) from the selected perceivable color space if the pixel position at Position (P', Q') in the rescaled image frame is not re-colored. The recoloring unit 118 validates that the new color (NC) is not equal to any of [Color (P−1, Q−1), Color (P−1, Q), Color (P−1, Q+1), Color (P, Q−1), Color (P, Q+1), Color (P+1, Q−1), Color (P+1, Q) and Color (P+1, Q+1)]. The step of selecting the new color from the selected perceivable color space is repeated for the other identified pixels, if the pixel at Position (P', Q') is not recolored.

The recoloring unit 118 is configured to randomly replenish a percentage of colors available in the perceivable color space, if it determined that all colors have been used and no new color is available for selection. The recoloring unit 118 triggers the color compensator unit 116 to update the replenished colors in the color compensator table.

Finally, the recoloring unit 118 transmits a corrected image frame comprising perceivable colors to the I/O terminal device 104.

In an embodiment of the present invention, a plurality of image frames are received and recolored by the recoloring unit 118. The plurality of corrected recolored image frames transmitted by the recoloring unit 118 and the corresponding input image frames are stored in a database. A machine learning model is generated based on the transmitted recolored image frames and corresponding input image frames. The machine learning model is used for correcting future input image frames. In an exemplary embodiment of the present invention, a Cycle Condition Generative Adversarial Network" or any other suitable machine learning or deep learning technique may be used for training the machine learning model with input and corrected recolored image frames.

In an embodiment of the present invention, the generated machine learning model is integrated with the color correction system 108 to correct images. In operation, an input image is fed to the machine learning model. The machine learning model triggers the color correction system 108 based on the percentage of the deviation to modify the corrected image. The generated corrected/modified image, is further fed to the machine learning model along with its input image for further training until the error percentage is minimum possible.

Figure 2:
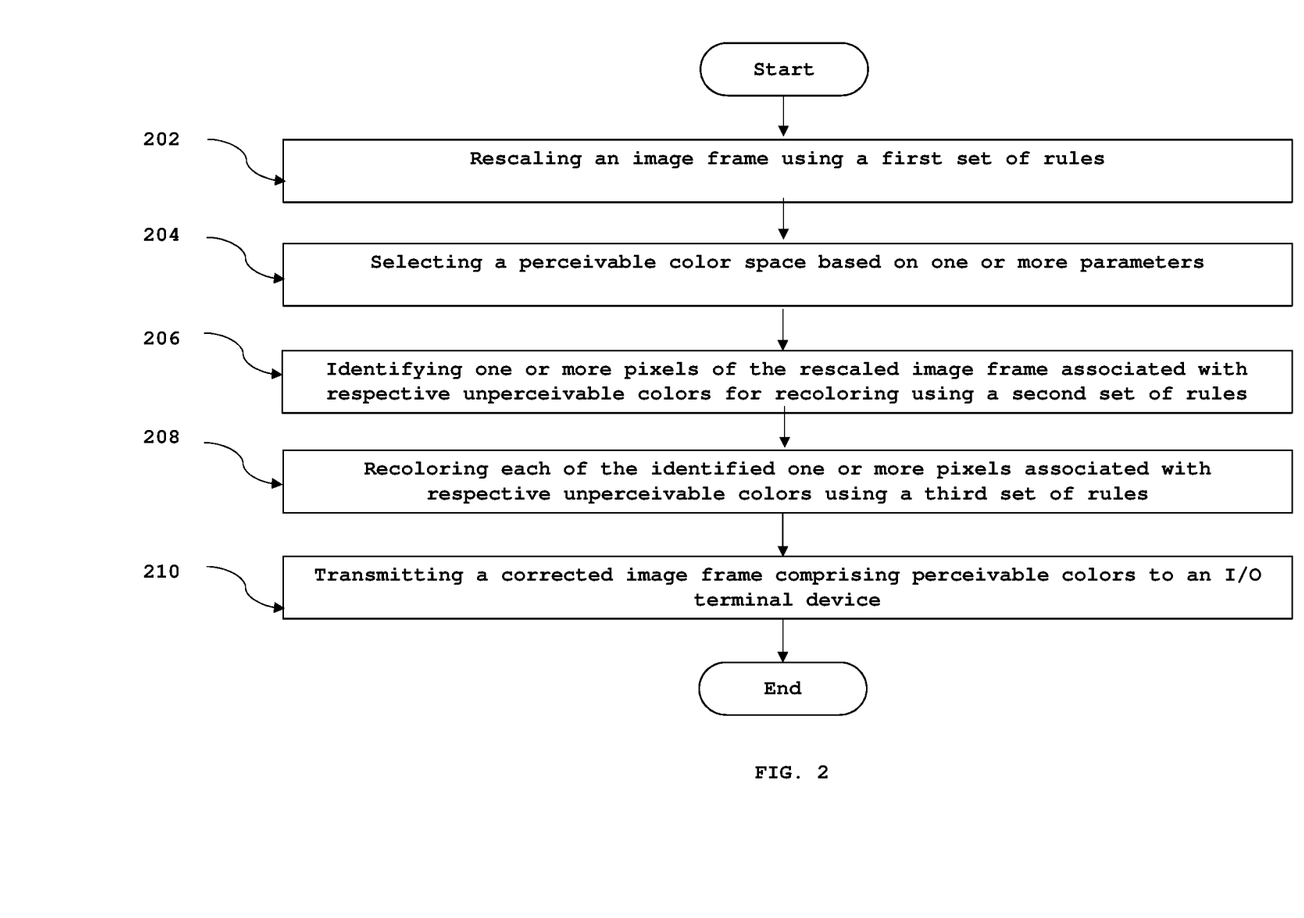
FIG. 2 is a flowchart illustrating a method for providing color vision deficiency assistance, in accordance with an embodiment of the present invention.

FIG. 2 is a flowchart illustrating a method for providing color vision deficiency assistance, in accordance with an embodiment of the present invention.

At step 202, an image frame is rescaled using a first set of rules. In an embodiment of the present invention, the image frame is retrieved from an image subsystem. The retrieved image frame includes unperceivable colors and is rescaled using a first set of rules. In an exemplary embodiment of the present invention, the first set of rules includes converting the retrieved image frame of resolution M by N into a desired resolution P by Q using the equations below:

$$P/X = 2^i, \text{ where}(2^i \times X) \leq M < (2^{(i+1)} \times X), X >= 3, P/X >= 1$$

and $$Q/Y = 2^j, \text{ where}(2^j \times Y) \leq N < (2^{(j+1)} \times Y), Q/Y >= 3, Q/Y >= 1,$$

wherein M, N, P, Q, X, Y, i and j are integers.

In an embodiment of the present invention, the value of X and Y are representative of a size selected for the leaf node (smallest matrix) which is discussed in detail later in the specification. In an exemplary embodiment of the present invention, X=Y=3 as the selected size of the leaf node is 3×3 as discussed later in the specification.

In an exemplary embodiment of the present invention, the rescaling of the retrieved image is prevented beyond a predefined threshold resolution. In the exemplary embodiment of the present invention, the predefined threshold resolution is 75% of the original scale of the image frame. In an exemplary embodiment of the present invention, P/M>=0.75 and Q/N>=0.75.

At step 204, a perceivable color space is selected based on one or more parameters. In an embodiment of the present invention, the one or more parameters include the type of color vision deficiency, closeness of color space with human perception of colors and one or more inputs received from a color deficient individual. In operation, an initial color space of the rescaled image frame is converted into another color space (hereinafter referred to as conversation color space) based on the closeness of color space with human perception of colors. In an embodiment of the present invention the initial color space is the RGB (Red, Green, Blue) color space. Examples of color space may include, but are not limited to, HSL (Hue, Saturation, Lightness), HSV (Hue, Saturation, Value), or LMS (Long-range, middle-range, short-range wavelength) color space or any other color space which aligns more closely with human perception of colors. In an exemplary embodiment of the present invention, the conversion color space is HSL (Hue, Saturation, and Lightness). The RGB color space of the rescaled image is converted into HSL color space by deriving the HSL (Hue, Saturation, and Lightness) values for each pixel of the rescaled image frame from the corresponding RGB (Red, Green, and Blue) values.

Further, the conversion color space is categorized into a perceivable color space and an unperceivable color space based on one or more unperceivable colors in the rescaled image. The one or more unperceivable colors are detected based on the type of color vision deficiency and one or more inputs received from a color deficient individual. The perceivable color space is selected for recoloring. In an exemplary embodiment of the present invention, if the color vision deficiency is deuteranopia, red-green colors are selected as unperceivable colors and shades of red-green are detected in the rescaled image. Further, the extent to which the red-green colors are unperceivable is detected based on one or more inputs from the color deficient individual. In an exemplary embodiment of the present invention, the one or more inputs from the color deficient individual include fine tuning an extent to which the unperceivable colors are not visible based on a degree of severity of color vision deficiency. In an exemplary embodiment of the present invention, where the conversion color space is HSL and the color vision deficiency is deuteranopia, the perceivable color space excludes red-green colors along with one or more shades of red-green color.

At step 206, one or more pixels of the rescaled image frame associated with respective unperceivable colors are identified for recoloring using a second set of rules. The second set of rules comprises constructing a quasi-region based quad-tree on the rescaled image frame to identify one or more pixels associated with respective unperceivable colors. In an embodiment of the present invention, a quasi-region based quad-tree represents a partition of space in two dimensions by decomposing the region into possibly four equal quadrants, sub-quadrants, and so on. The 2-dimensional space is representative of a root node, and each quadrant is representative of a child node of the root node. Each sub-quadrant is representative of a child node of a quadrant whereby each quadrant is interpreted as a parent node. Similarly, each sub-quadrant is interpreted as a parent node for its children. Each node in the tree can have four or two or zero children. The node with zero children is representative of a leaf node. If a child of a node is a leaf node, all other children of that parent node must also be leaf nodes. Each leaf node in the quasi-region based quad-tree comprises data corresponding to a specific sub-region.

In operation, a quasi-region based quad-tree data structure is constructed on the rescaled image frame. The rescaled image frame is interpreted as a 2-Dimensional matrix comprising a plurality of pixels. Further, the rescaled image frame is representative of a root node. In an exemplary embodiment of the present invention, for resolution P by Q of the rescaled image frame, the rescaled image frame is interpreted as a P×Q matrix comprising P rows and Q columns. Each pixel position in the rescaled image frame is represented by Position (P, Q) having corresponding Color (P, Q) with respective color space value. The rescaled image frame (root node) is further split into four quadrants (child nodes of root). Each of the four quadrants (parent nodes) are recursively split into four, two or zero sub-quadrants (child nodes of parent) upto a plurality of leaf nodes, until the entire rescaled image is split into multiple of leaf nodes. In an embodiment of the present invention the size of the leaf node is selected based on the size of pixel matrix. In an exemplary embodiment of the present invention, each leaf node is representative of a 3×3 matrix and is logically divided into 8 border pixels and 1 center pixel. As described above, each leaf node is representative of a node with no child. In an exemplary embodiment of the present invention, a 3×3 matrix is selected as a leaf node, however in other embodiments of the present invention, 3×4 or 4×3 matrix having 2 central pixels surrounded by 10 border pixels may be selected as a leaf node. Each leaf node comprises color information associated with corresponding pixels. In an exemplary embodiment of the present invention, where the rescaled image is converted into corresponding HSL color space, each pixel of respective leaf node has an HSL value corresponding to its RGB value.

Further, the second set of rule comprises identifying each leaf node comprising one or more center pixels and a plurality of border pixels having one or more unperceivable colors. In an embodiment of the present invention, the identification is performed by analyzing the color space values of each leaf node and rejecting the leaf nodes with border pixels and center pixels in the perceivable color space. In an exemplary embodiment of the present where the color conversion color space is HSL, a check is performed to determine if the HSL value of each of the plurality of border pixels and the center pixel of the leaf node is in the perceivable color space. The leaf nodes, where the border pixels and center pixels have the HSL value in the perceivable color space.

The second set of rules further include determining one or more contender nodes comprising one or more center pixels having unperceivable colors different from each of the corresponding plurality of border pixels. The determination is performed by recursively analyzing color space values of the one or more center pixels and the plurality of border pixels of each of the identified leaf node until one or more center pixels are found to be having unperceivable colors different from each of the corresponding plurality of border pixels. Further, the one or more center pixels of each of the contender nodes are selected for recoloring. The step of determining contender nodes is repeated on the higher nodes of the identified leaf node upto to the root node if the one or more unperceivable colors of the center pixels of the leaf nodes are not found to be different from the corresponding border pixels. The step of determining contender nodes is repeated until border and center pixels of different unperceivable colors are determined in the higher nodes upto the root node and the center pixels of the contender node are selected for recoloring. In an exemplary embodiment of the present invention, a check is performed to determine if both the border and the center pixels of the leaf node are of same unperceivable color by analyzing if the HSL value of the border pixels and the center pixel is same. The parent node of the leaf node is selected for further analyses if both the border and the center pixels of the leaf node are of the same unperceivable color. Furthermore, a check is performed to determine if both the border and the center pixels of the selected parent node are of the same unperceivable color.

At step 208, each of the identified one or more pixels associated with respective unperceivable colors are recolored using a third set of rules. In an embodiment of the present invention, each center pixel associated with unperceivable color for each contender node including leaf node or associated higher nodes of the leaf node is recolored if both the border pixels and center pixel(s) are of different unperceivable colors. In an exemplary embodiment of the present invention, the higher nodes include parent nodes upto the root node of the leaf node. In case the contender for recoloring is the parent node, the border pixels are recomputed which are different from the border pixels of its children. In an embodiment of the present invention, each center pixel is recolored recursively starting from the leaf node through the associated higher nodes upto the root node. Further, a suitable perceivable color for recoloring the center pixels is determined by considering all the colors associated with the border pixels.

The identified one or more pixels associated with unperceivable colors are recolored based on the selected perceivable color space using a third set of rules. In an embodiment of the present invention, the third set of rules comprises determining if a color compensator table is empty and choosing a new color from the selected perceivable color space if no mapping exists in the color compensator table. A new color is chosen from the selected perceivable color space using a fourth set of rules as described later in the specification. In an embodiment of the present invention, the color compensator table is a dynamic table configured to maintain a record of each perceivable color mapped with one or more unperceivable colors. In a preferred embodiment of the present invention, each perceivable color is mapped with a single unperceivable color. The color compensator table is initially empty and is populated on the fly with color mapping information.

Further, the third set of rules includes identifying a color mapping between an unperceivable color associated with one of the identified one or more pixels and a perceivable color in a color compensator table if an availability of color mapping in the color compensator table is determined. Repeating the step of identification for each of the identified one or more pixels. In particular, for each Position (P, Q) of a pixel, if Color (P, Q) is unperceivable, a check is performed to determine if Color (P, Q) is already mapped with a perceivable color in the color compensator table.

Further, the third set of rules include, recoloring one of the identified one or more pixels with the identified color mapping if color of each of the corresponding border pixels is found to be different from the perceivable color mapped in the color compensator table. The step of recoloring is repeated for the other identified pixels. In particular, for each Position (P, Q), a check is performed to validate that the Color (P, Q) is not equal to any of the boundary colors [Color (P−1, Q−1), Color (P−1, Q), Color (P−1, P+1), Color (P, Q−1), Color (P, Q+1), Color (P+1, Q−1), Color (P+1, Q) and Color (P+1, Q+1)]

Finally, the third set of rules include choosing a new color from the selected perceivable color space using a fourth set of rules for recoloring the identified one or more pixels associated with the unperceivable color if color of any of the corresponding border pixels is same as the perceivable color mapped in the color compensator table.

The fourth set of rules comprises selecting the new color for one of the identified pixels associated with the unperceivable color by computing minimum distance between color space value associated with the unperceivable color and color space values of each of the corresponding border pixel colors. In an exemplary embodiment of the present invention, the least difference (Minimum-Distance) of the color space value associated with Color (P, Q) from neighboring colors, Color (P−1, Q−1), Color (P−1, Q), Color (P−1, Q+1), Color (P, Q−1), Color (P, Q+1), Color (P+1, Q−1), Color (P+1, Q) and Color (P+1, Q+1) is computed. A Position (P', Q') for the pixel having least difference with Color (P, Q) is determined based on the computation a Position (P', Q') of the corresponding border pixels with minimum distance.

The fourth set of rules further comprises determining if the pixel at Position (P', Q') in the rescaled image frame is re-colored into different color space value. The new color having a distance nearest to the computed minimum distance is chosen from the selected perceivable color space if the border pixel at Position (P', Q') is found to be recolored. In particular, a new color is chosen from the selected perceivable color space having distance nearest to Minimum-Distance, i.e., absolute value of {(Color (P, Q)–Color (P', Q')} Minimum-Distance, if the pixel at Position (P', Q') in the rescaled image frame is already re-colored into a different color value. The step of selecting the new color is repeated for the other identified pixels.

The new color is chosen from the selected perceivable color space for recoloring one of the identified pixels if the pixel at Position (P', Q') is not recolored. In particular, a new color (NC) is chosen from the selected perceivable color space if the pixel position at Position (P', Q') in the rescaled image frame is not re-colored. A check is performed to validate that the new color (NC) is not equal to any of [Color (P−1, Q−1), Color (P−1, Q), Color (P−1, Q+1), Color (P, Q−1), Color (P, Q+1), Color (P+1, Q−1), Color (P+1, Q) and Color (P+1, Q+1)]. The step of selecting the new color from the selected perceivable color space is repeated for the other identified pixels, if the pixel at Position (P', Q') is not recolored.

The color compensator table is updated after the first mapping and is maintained for each mapped color. As described above, the color compensator table is a dynamic table comprising a record of each perceivable color mapped with one or more unperceivable colors. In a preferred embodiment of the present invention, each perceivable color is mapped with a single unperceivable color.

In an embodiment of the present invention, a percentage of colors available in the perceivable color space are replenished in the color compensator table, if it is determined that all colors have been used and no new color is available for selection. The replenished colors are updated in the color compensator table.

At step 210, a corrected image frame comprising perceivable colors is transmitted to an I/O terminal device.

In an embodiment of the present invention, a plurality of image frames are received and recolored using steps 201 to 208. The plurality of transmitted recolored images and the corresponding input images are stored in a database. A machine learning model is generated based on the transmitted recolored image frames and corresponding input image frames. The machine learning model is used for correcting future incoming image frames including unperceivable colors. In an exemplary embodiment of the present invention, a Cycle Condition Generative Adversarial Network" or any other suitable machine learning or deep learning technique may be used for training the machine learning model with input and output images.

Various embodiments of the present invention may be implementable via a computer system, a camera, a smart phone, a Virtual reality (VR) device, an Augmented reality (AR) device, a Mixed reality (MR) device such as a Hololens or any other computing device.

Figure 3:
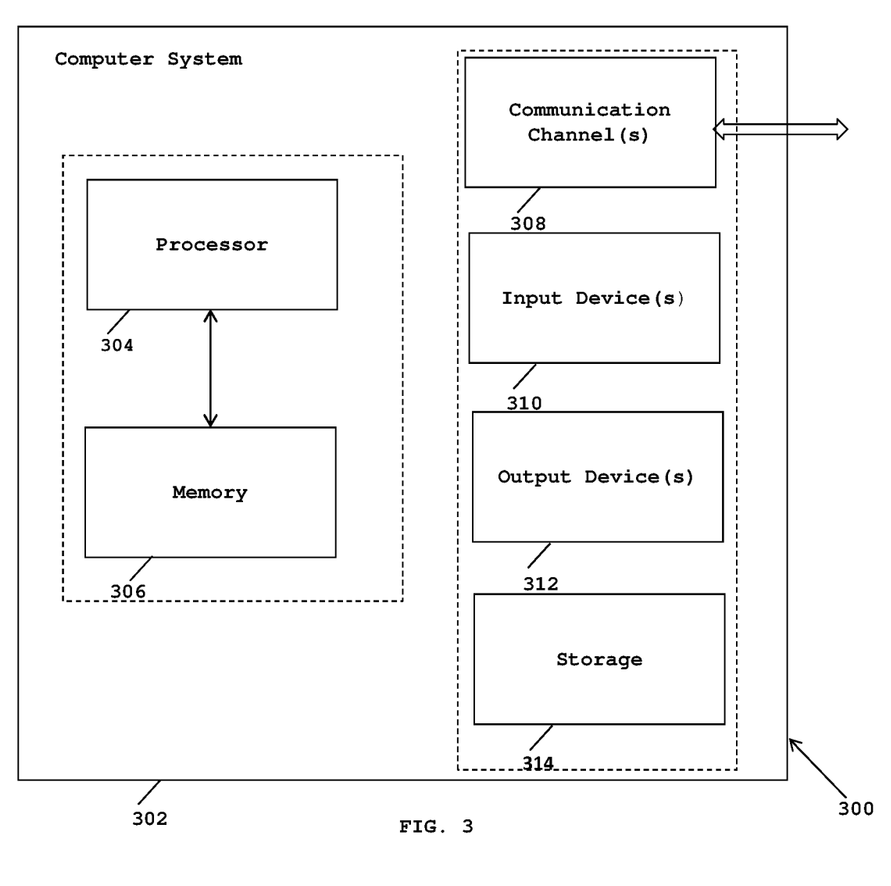
FIG. 3 illustrates an exemplary computer system in which various embodiments of the present invention may be implemented.

FIG. 3 illustrates an exemplary computer system in which various embodiments of the present invention may be implemented. The computer system 302 comprises a processor 304 and a memory 306. The processor 304 executes program instructions and is a real processor. The computer system 302 is not intended to suggest any limitation as to scope of use or functionality of described embodiments. For example, the computer system 302 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various software executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 310 may include, but not limited to, a keyboard, mouse, pen, joystick, trackball, a voice device, a scanning device, touch screen, Augmented reality (AR) device, Virtual reality (VR) or any another device that is capable of providing input to the computer system 302. In an embodiment of the present invention, the input device(s) 310 may be a graphic card, a lens or similar device that accepts video input in analog or digital form. The output device(s) 312 may include, but not limited to, a user interface on CRT or LCD, printer, speaker, CD/DVD writer, Augmented reality (AR) device, Virtual reality (VR), Mixed reality (MR) device or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

We claim:

1. A method for providing color vision deficiency assistance by selectively recoloring pixels of an image frame including unperceivable colors, wherein the method is implemented by at least one processor executing program instructions stored in a memory, the method comprising:

rescaling the image frame using a first set of rules, wherein the first set of rules comprises converting the retrieved image of resolution M by N into a resolution P by Q, and wherein the first set of rules comprises converting the retrieved image frame of resolution M by N into a desired resolution P by Q using the equation $P/X=2^i$, where $(2^i \times X) \leq M < (2^{(i+1)} \times X)$, $X >= 3$, $P/X >= 1$ and $Q/Y=2^j$, where $(2^j \times Y) \leq N < (2^{(j+1)} \times Y)$, $Y >= 3$, $Q/Y >= 1$, wherein M, N, P, Q, X, Y, i and j are integers;

selecting a predefined perceivable color space based on one or more parameters;

identifying one or more pixels of the rescaled image frame associated with respective unperceivable colors for recoloring using a second set of rules; and recoloring the identified one or more pixels using the selected perceivable color space and a third set of rules.

2. The method as claimed in claim 1, wherein selecting a predefined color space comprises:

converting an initial color space of the rescaled image frame into a conversion color space based on the one or more parameters including closeness of color space with human perception of colors, wherein a conversion color space values for each pixel of the rescaled image frame is derived from corresponding initial color space values;

categorizing the conversion color space into a perceivable color space and an unperceivable color space based on one or more unperceivable colors in the rescaled image, wherein the one or more unperceivable colors are detected based on the one or more parameters including type of color vision deficiency and one or more inputs received from the color deficient individual; and selecting the perceivable color space for recoloring.

3. The method as claimed in claim 2, wherein the initial color space is RGB (Red, Green, Blue) color space and the conversion color space is selected from HSL (Hue, Saturation, Lightness), HSV (Hue, Saturation, Value), LMS (Long-range, middle-range, short-range wavelength) color space or any other color space which aligns closely with human perception of colors.

4. The method as claimed in claim 2, wherein the one or more inputs from the color deficient individual include fine tuning an extent to which the unperceivable colors are not visible based on a degree of severity of color vision deficiency.

5. The method as claimed in claim 1, wherein the second set of rules includes:

constructing a quasi-region based quad-tree data structure on the rescaled image frame, wherein the rescaled image frame is representative of a root node comprising a plurality of pixels, wherein further the root node is recursively split into four, two or zero equal smaller nodes upto a plurality of leaf nodes, each smaller node and each leaf node comprising one or more center pixel(s) and a plurality of border pixels;

identifying each leaf node comprising one or more center pixels and a plurality of border pixels having one or more unperceivable colors, wherein the identification is performed by analyzing the color space values of each leaf node and rejecting the leaf nodes with border pixels and center pixels in the perceivable color space;

determining one or more contender nodes comprising one or more center pixels having unperceivable colors different from each of the corresponding plurality of border pixels, wherein the determination is performed by recursively analyzing color space values of the one or more center pixels and the plurality of border pixels of each of the identified leaf node until one or more center pixels are found to be having unperceivable colors different from each of the corresponding plurality of border pixels;

selecting the one or more center pixels of each of the contender nodes for recoloring; and repeating the step of determining contender nodes and selecting the center pixels of the contender node for recoloring, wherein the determination is performed on the higher nodes of the identified leaf node upto to the root node if the one or more unperceivable colors of the center pixels of the leaf nodes are not found to be different from the corresponding border pixels.

6. The method as claimed in claim 5, wherein the third set of rules comprises:

identifying a color mapping between an unperceivable color associated with one of the identified one or more pixels and a perceivable color in a color compensator table for each of the identified one or more pixels based on determination of availability of a color mapping in the color compensator table; and recoloring one of the identified one or more pixels with the identified color mapping if color of each of the corresponding border pixels is found to be different from the perceivable color mapped in the color compensator table, and wherein the step of identifying and recoloring is repeated for the other identified pixels.

7. The method as claimed in claim 6, wherein the third set of rules comprises choosing a new color from the selected perceivable color space using a fourth set of rules for recoloring the identified one or more pixels associated with the unperceivable color if color of any of the corresponding border pixels is same as the perceivable color mapped in the color compensator table.

8. The method as claimed in claim 7, wherein the fourth set of rules comprises selecting the new color for one of the identified pixels associated with the unperceivable color by computing minimum distance between color space value associated with the unperceivable color and color space values of each of the corresponding border pixel colors, wherein based on the computation a Position (P', Q') of the corresponding border pixels with minimum distance is determined, and wherein the new color having a distance nearest to the computed minimum distance is chosen from the selected perceivable color space if the border pixel at Position (P', Q') is found to be recolored, and wherein the step of selecting the new color is repeated for the other identified pixels.

9. The method as claimed in claim 8, wherein the new color is chosen from the selected perceivable color space for recoloring one of the identified pixels if the pixel at Position (P', Q') is not recolored, wherein the new color is chosen based on a validation that the new color is different from each of the corresponding border pixels, and wherein the step of selecting the new color from the selected perceivable color space is repeated for the other identified pixels, if the pixel at Position (P', Q') is not recolored.

10. The method as claimed in claim 1, wherein the third set of rules comprises choosing a new color from the selected perceivable color space using a fourth set of rules for recoloring the identified one or more pixels if a color compensator table is empty, further wherein the color compensator table is a dynamic table populated with color mapping information to maintain a record of each perceivable color mapped with one or more unperceivable colors.

11. The method as claimed in claim 1, wherein a percentage of colors available in the selected perceivable color space are replenished if no new color is available for selection.

12. The method as claimed in claim 1, wherein a machine learning model is generated based on the recolored image frames and the corresponding input image frames, wherein further the machine learning model selectively recolors pixels of incoming image frames including unperceivable colors.

13. A system for providing color vision deficiency assistance in real time, the system comprising:

a memory storing program instructions; a processor configured to execute program instructions stored in the memory; and a color correction engine in communication with the processor and configured to:

rescale a retrieved image frame using a first set of rules, wherein the first set of rules comprises converting the retrieved image of resolution M by N into a resolution P by Q, and wherein the first set of rules comprises converting the retrieved image frame of resolution M by N into a desired resolution P by Q using the equation $P/X=2^i$, where $(2^i \times X) \leq M < (2^{(i+1)} \times X)$, $X>=3$, $P/X>=1$ and $Q/Y=2^j$, where $(2^j \times Y) \leq N < (2^{(j+1)} \times Y)$, $Y>=3$, $Q/Y>=1$, wherein M, N, P, Q, X, Y, i and j are integers;

select a predefined perceivable color space based on one or more parameters;

identify one or more pixels of the rescaled image frame associated with one or more unperceivable colors for recoloring using a second set of rules; and recolor the identified one or more pixels using the selected perceivable color space and a third set of rules.

14. The system as claimed in claim 13, wherein color correction engine comprises a color compensator unit in communication with the processor, said color compensator unit configured to select the predefined color space by:

converting an initial color space of the rescaled image frame into a conversion color space based on the one or more parameters including closeness of color space with human perception of colors, wherein a conversion color space values for each pixel of the rescaled image frame is derived from corresponding initial color space values;

categorizing the conversion color space into a perceivable color space and an unperceivable color space based on one or more unperceivable colors in the rescaled image, wherein the one or more unperceivable colors are detected based on the one or more parameters including type of color vision deficiency and one or more inputs received from the color deficient individual; and selecting the perceivable color space for recoloring.

15. The system as claimed in claim 14, wherein the initial color space is RGB (Red, Green, Blue) color space and the conversion color space is selected from HSL (Hue, Saturation, Lightness), HSV (Hue, Saturation, Value), LMS (Long-range, middle-range, short-range wavelength) color space or any other color space which aligns closely with human perception of colors.

16. The system as claimed in claim 14, wherein the one or more inputs from the color deficient individual include fine tuning an extent to which the unperceivable colors are not visible based on a degree of severity of color vision deficiency.

17. The system as claimed in claim 13, wherein color correction engine comprises a recoloring unit in communication with the processor, said recoloring unit configured to identify the one or more pixels of the rescaled image frame for recoloring using the second set of rules, wherein the second set of rules comprises:

constructing a quasi-region based quad-tree data structure on the rescaled image frame, wherein the rescaled image frame is representative of a root node comprising a plurality of pixels, wherein further the root node is recursively split into four, two or zero equal smaller nodes upto a plurality of leaf nodes, each smaller node and each leaf node comprising one or more center pixel(s) and a plurality of border pixels;

identifying each leaf node comprising one or more center pixels and a plurality of border pixels having one or more unperceivable colors, wherein the identification is performed by analyzing the color space values of each leaf node and rejecting the leaf nodes with border pixels and center pixels in the perceivable color space;

determining one or more contender nodes comprising one or more center pixels having unperceivable colors different from each of the corresponding plurality of border pixels, wherein the determination is performed by recursively analyzing color space values of the one or more center pixels and the plurality of border pixels of each of the identified leaf node until one or more center pixels are found to be having unperceivable colors different from each of the corresponding plurality of border pixels;

selecting the one or more center pixels of each of the contender nodes for recoloring; and repeating the step of determining contender nodes and selecting the center pixels of the contender node for recoloring, wherein the determination is performed on the higher nodes of the identified leaf node upto to the root node if the one or more unperceivable colors of the center pixels of the leaf nodes are not found to be different from the corresponding border pixels.

18. The system as claimed in claim 17, wherein the recoloring unit is configured to recolor the identified one or more pixels using the third set of rules and the selected perceivable color space, wherein the third set of rules comprises:

identifying a color mapping between an unperceivable color associated with one of the identified one or more pixels and a perceivable color in a color compensator table for each of the identified one or more pixels based on determination of availability of a color mapping in the color compensator table; and recoloring one of the identified one or more pixels with the identified color mapping if color of each of the corresponding border pixels is found to be different from the perceivable color mapped in the color compensator table, and wherein the step of identifying and recoloring is repeated for the other identified pixels.

19. The system as claimed in claim 18, wherein the third set of rules comprises choosing a new color from the selected perceivable color space using a fourth set of rules for recoloring the identified one or more pixels associated with the unperceivable color if color of any of the corresponding border pixels is same as the perceivable color mapped in the color compensator table.

20. The system as claimed in claim 19, wherein the fourth set of rules comprises selecting the new color for one of the identified pixels associated with the unperceivable color by computing minimum distance between color space value associated with the unperceivable color and color space values of each of the corresponding border pixel colors, wherein based on the computation a Position (P', Q') of the corresponding border pixels with minimum distance is determined, and wherein the new color having a distance nearest to the computed minimum distance is chosen from the selected perceivable color space if the border pixel at Position (P', Q') is found to be recolored, and wherein the step of selecting the new color is repeated for the other identified pixels.

21. The system as claimed in claim 20, wherein the new color is chosen from the selected perceivable color space for recoloring one of the identified pixels if the pixel at Position (P', Q') is not recolored, wherein the new color is chosen based on a validation that the new color is different from each of the corresponding border pixels, and wherein the step of selecting the new color from the selected perceivable color space is repeated for the other identified pixels, if the pixel at Position (P', Q') is not recolored.

22. The system as claimed in claim 13, wherein the third set of rules comprises choosing a new color from the selected perceivable color space using a fourth set of rules for recoloring the identified one or more pixels if a color compensator table is empty, further wherein the color compensator table is a dynamic table populated with color mapping information to maintain a record of each perceivable color mapped with one or more unperceivable colors.

23. The system as claimed in claim 13, wherein a percentage of colors available in the selected perceivable color space are replenished based on determination of unavailability of any new color for selection.

24. A computer program product comprising:

a non-transitory computer-readable medium having computer-readable program code stored thereon, the computer-readable program code comprising instructions that, when executed by a processor, cause the processor to:

rescale a retrieved image frame using a first set of rules, wherein the first set of rules comprises converting the retrieved image of resolution M by N into a resolution P by Q, and wherein the first set of rules comprises converting the retrieved image frame of resolution M by N into a desired resolution P by Q using the equation $P/X=2^i$, where $(2^i \times X) \leq M < (2^{(i+1)} \times X)$, $X >= 3$, $P/X >= 1$ and $Q/Y=2^j$, where $(2^j \times Y) \leq N < (2^{(j+1)} \times Y)$, $Y >= 3$, $Q/Y >= 1$, wherein M, N, P, Q, X, Y, i and j are integers;

select a predefined perceivable color space based on one or more parameters;

identify one or more pixels of the rescaled image frame associated with one or more unperceivable colors for recoloring using a second set of rules; and recolor the identified one or more pixels using the selected perceivable color space and a third set of rules.

* * * * *